(12) United States Patent
Hashimoto et al.

(10) Patent No.: US 6,816,503 B1
(45) Date of Patent: Nov. 9, 2004

(54) NETWORK SYSTEM HAVING AT LEAST ONE DATA PROCESSOR CAPABLE OF TRANSMITTING AT LEAST ONE MESSAGE MORE THAN OTHER DATA PROCESSORS

(75) Inventors: Hiroshi Hashimoto, Saitama (JP); Kazuya Iwamoto, Saitama (JP); Yuji Nagatani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,194

(22) Filed: Apr. 20, 1999

(30) Foreign Application Priority Data

Apr. 20, 1998 (JP) ............................................ 10-109519

(51) Int. Cl.[7] ............................................. H04L 12/403
(52) U.S. Cl. ....................................................... 370/450
(58) Field of Search ................................ 370/450–457, 370/488, 401–404, 258, 468, 224, 503, 407, 336, 345, 350; 709/216–238, 225–228, 245, 316, 246; 340/451, 825.52, 825.51, 531; 455/517, 426, 552–554

(56) References Cited

U.S. PATENT DOCUMENTS

| | | | | |
|---|---|---|---|---|
| 4,667,322 A | * | 5/1987 | Ulug ........................... | 370/452 |
| 4,667,323 A | * | 5/1987 | Engdahl et al. ............. | 370/451 |
| 4,792,849 A | * | 12/1988 | McCalley et al. .......... | 725/119 |
| 4,792,947 A | * | 12/1988 | Takiyasu et al. ............ | 370/452 |
| 4,825,204 A | * | 4/1989 | Nakamura .................. | 370/451 |
| 4,866,706 A | | 9/1989 | Christophersen et al. .. | 370/85.7 |
| 4,930,121 A | * | 5/1990 | Shiobara ..................... | 370/451 |
| 4,951,280 A | * | 8/1990 | McCool et al. ............. | 370/258 |
| 5,634,006 A | * | 5/1997 | Baugher et al. ............ | 370/229 |
| 5,724,599 A | * | 3/1998 | Balmer et al. ................ | 712/43 |
| 5,781,745 A | * | 7/1998 | Ramelson et al. .......... | 709/225 |
| 5,835,725 A | * | 11/1998 | Chiang et al. .............. | 709/228 |
| 5,878,221 A | * | 3/1999 | Szkopek et al. ............ | 370/488 |
| 5,903,559 A | * | 5/1999 | Acharya et al. ............ | 370/355 |
| 5,915,093 A | * | 6/1999 | Berlin et al. ................ | 709/219 |
| 6,172,981 B1 | * | 1/2001 | Cox et al. ................... | 370/401 |
| 6,189,041 B1 | * | 2/2001 | Cox et al. ................... | 709/238 |
| 6,400,701 B2 | * | 6/2002 | Lin et al. .................... | 370/336 |

FOREIGN PATENT DOCUMENTS

| | | | | |
|---|---|---|---|---|
| JP | 5-292102 | 11/1993 | ........... | H04L/12/40 |
| JP | 5-316124 | 11/1993 | ........... | H04L/12/40 |
| JP | 7-7504 | 1/1995 | ........... | H04L/12/28 |

* cited by examiner

*Primary Examiner*—Chi Pham
*Assistant Examiner*—Prenell Jones
(74) *Attorney, Agent, or Firm*—Sughrue Mion, PLLC

(57) ABSTRACT

In a network system which sequentially passes a right to transmit in the form of a token and includes a plurality of data processors, at least one of the plurality of data processors is set so as to be able, during each possession of the token, to send messages in greater number than those transmitted by each of the remaining data processors by at least one. The data processor that is allowed to send many messages consecutively sends messages by inserting, into a token address field included in a message format, its own address during transmission. In the case of a server/client network, a server is set so as to consecutively send a number of messages at a time, while in possession of the token.

14 Claims, 3 Drawing Sheets

DATA MESSAGE

| 1 | 4 | 2 | 32 - 96 | 15 | 4 | 4 | 6 |
|---|---|---|---------|----|----|----|---|
| SOM | TA | CTL | DATA UNIT | FCS | DACK | TACK | EOM |

TOKEN MESSAGE

| 1 | 4 | 2 | 4 | 6 |
|---|---|---|---|---|
| SOM | TA | CTL | TACK | EOM |

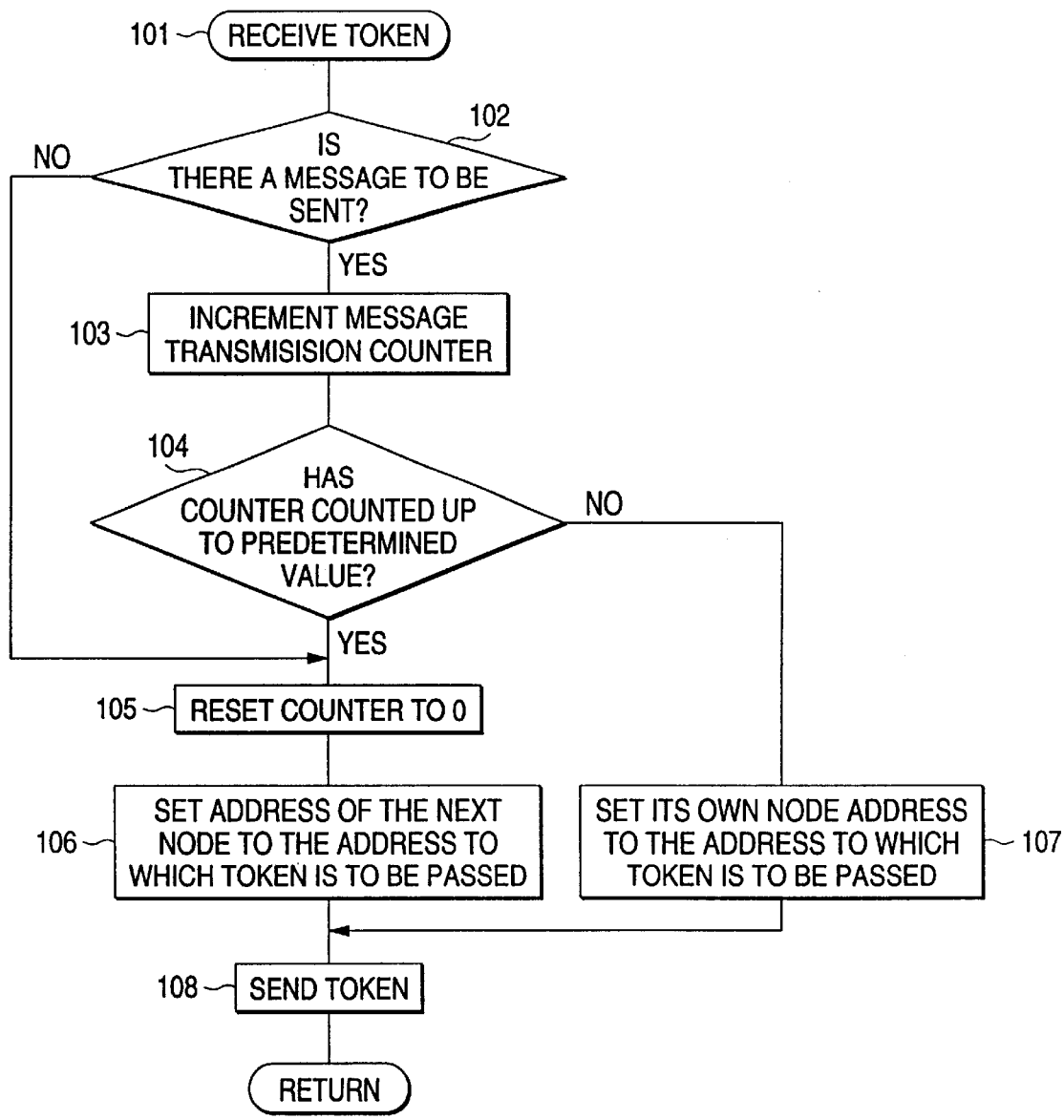

NETWORK SYSTEM HAVING AT LEAST ONE DATA PROCESSOR CAPABLE OF TRANSMITTING AT LEAST ONE MESSAGE MORE THAN OTHER DATA PROCESSORS

BACKGROUND OF THE INVENTION

1. Field of the Invention

The present invention relates to the control of communication among a plurality of data processing devices, and more particularly, to a network system which carries out communication according to a token passing style.

2. Description of the Related Art

A token passing style is one of the communication styles that can be employed in a local area network (LAN) which interconnects a plurality of data processing devices.

According to the token passing style, a right-to-transmit information called a "token" is passed among the processing devices, and each processing device is allowed to transmit data only when possessing the token. The token is passed to the next processing device when a processing device has no data to be transmitted or after lapse of a predetermined hold time or period.

In a ring network, the token is passed to the next processing device along the ring. In a bus network, the token is passed by insertion of the address of the device to which the token is to be passed.

Japanese Patent Application Laid-open No. 7-7504 describes an on-vehicle LAN which interconnects a plurality of electronic controllers mounted on a vehicle. In this on-vehicle LAN, each of the plurality of electronic controllers sends sensor data to a single control-processing-communication unit. On the basis of the received data, the control-processing-communication unit performs arithmetic processing operations and returns a control signal to each of the electronic controllers. A so-called server-client network is established in the on-vehicle LAN.

Japanese Patent Application Laid-open Nos. 5-292102 and 5-316124 describe an on-vehicle LAN which employs a bus to interconnect a plurality of electronic controllers mounted on a vehicle.

Under the conventional token passing style, the token is passed such that each of the plurality of data processing devices constituting the LAN possesses the token for the same amount of time. In a case where there is a great imbalance in the volume of data passed among the plurality of data processing devices, the data processing device which must send a large volume of data requires many token-holding cycles to deliver the large volume of data, which takes a large amount of time and causes a lag in communication.

SUMMARY OF THE INVENTION

Accordingly, an object of the present invention is to improve the efficiency of communication among a plurality of data processing devices, which are perhaps unbalanced in terms of the volume of data to be transmitted, in a communications network which passes the right to transmit in the form of a token.

To solve the foregoing problems, according to a first aspect of the present invention, there is provided a network system which includes a plurality of data processors and sequentially passes the right to transmit in the form of a token among the data processors, wherein at least one of the plurality of data processors is set so as to be able, during each possession of the token, to send messages in greater number than those transmitted by each of the remaining data processors by at least one.

By means of the present invention, the volume of message data which can be transmitted during a token holding time can be varied from one data processor to another. Accordingly, efficient communication can be established among a plurality of data processors which are unbalanced in terms of traffic volume.

According to the second aspect of the present invention, the network system as defined in the first aspect is further characterized by a data processor that is allowed to send many messages consecutively, wherein the data processor sends messages by inserting, into a token address field included in a message format, its own address during transmission.

By means of the present invention, the number of messages sent by a data processor can be increased by setting its own address as the token address while the basic configuration of the network is one which sequentially passes the token among a plurality of data processors. Accordingly, efficient communication can be established among a plurality of data processors which are unbalanced in terms of volume of data to be transmitted.

According to a third aspect of the present invention, the network system as defined in the second aspect is further characterized in that the data processors are associated with one another in the form of a server/client relationship, and the data processor that can send many messages is a server.

By means of the present invention, a server can possess the token for a time period substantially longer than those of clients, thereby enabling efficient support of a plurality of clients.

BRIEF DESCRIPTION OF THE DRAWINGS

FIG. 4A is the format of a data message used for the token passing style and

FIG. 4B is the format for a token message.

FIG. 5 is a flowchart showing a process flow according to the preferred embodiment of the present invention.

DESCRIPTION OF THE PREFERRED EMBODIMENTS

A preferred embodiment of the present invention will now be described by reference to the accompanying drawings while taking an on-vehicle computer network system as an example of the present invention. The present invention is not limited to application in an on-vehicle computer network system and may be implemented in a variety of applications, including e.g. in a communications network of data processing devices.

Figure 1:
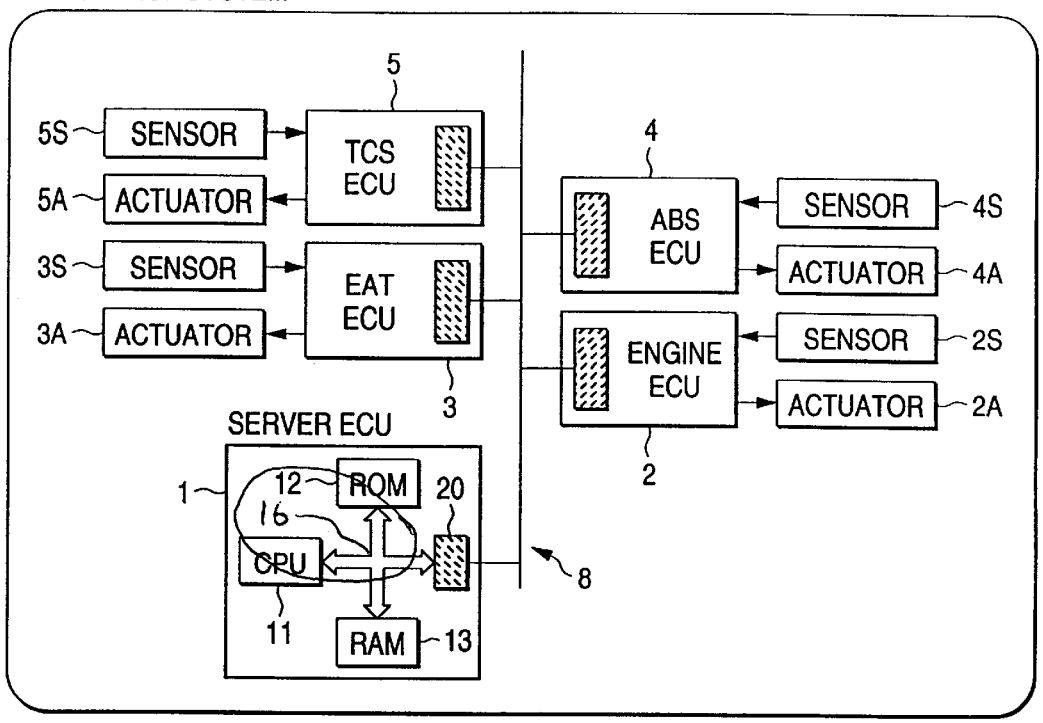
FIG. 1 is a block diagram showing the overall configuration of an on-vehicle computer network system according to a preferred embodiment of the present invention.

FIG. 1 is a block diagram showing the overall configuration of an on-vehicle computer network system, wherein a plurality of electronic control units (hereinafter abbreviated "ECUs") are connected together by way of a network bus 8.

The plurality of electronic control units constitutes a network system, in which one of the ECUs serves as a server ECU and the remaining ECUs serve as clients.

A server ECU 1 comprises a data processor (CPU) 11 for performing arithmetic operations; nonvolatile read-only memory (ROM) 12 for storing a computer program; random access memory (RAM) 13 which provides a work area for computation by the CPU at the time of operation of the ECU and which temporarily stores various types of data sets and programs; and a communications controller 20 which receives and sends messages from and to the network bus 8. The CPU 11, the ROM 12, the RAM 13, and the communications controller 20 are interconnected by way of a data bus 16.

An engine ECU 2 controls the operation of an engine according to the driving state of the vehicle, such as the quantity of fuel injection into the engine and ignition timing. The engine ECU 2 receives signals output from sensors 2S relating to the engine, such as an intake pipe pressure sensor, an air/fuel ratio sensor, and an engine water-temperature sensor, and sends the signals to the server ECU 1 after having digitized the same. On the basis of the received data, the server ECU 1 performs operations and returns to the engine ECU 2 information regarding the basic fuel injection time and ignition timing. On the basis of the information received from the server ECU 1, the engine ECU 2 performs operations to control actuators 2A such as a fuel injector and an ignition plug.

The network bus 8 is connected to an electronic control automatic transmission (EAT) ECU 3, an anti-lock braking system (ABS) ECU 4, and a traction control system (TCS) ECU 5, as well as to the engine ECU 2. Further, a 4-wheel drive ECU, a 4-wheel steering ECU, and a suspension control ECU among others may also be connected to the network bus 8.

Each of the client ECUs comprises a CPU, ROM, RAM, and a communications controller. The computing power of the client ECU may be lower than that of the server ECU 1, and the client ECU may have smaller ROM and RAM capability than the server ECU 1. Each of the client ECUs comprises a signal processor and a drive circuit. The signal processor receives signals output from relevant sensors 2S, 3S, 4S, or 5S, subjects the thus-received signals to waveform shaping, and generates digital signals through analog-to-digital conversion. The drive circuit sends drive signals to relevant actuators 2A, 3A, 4A, or 5A on the basis of control signals obtained through computation.

Figure 2:
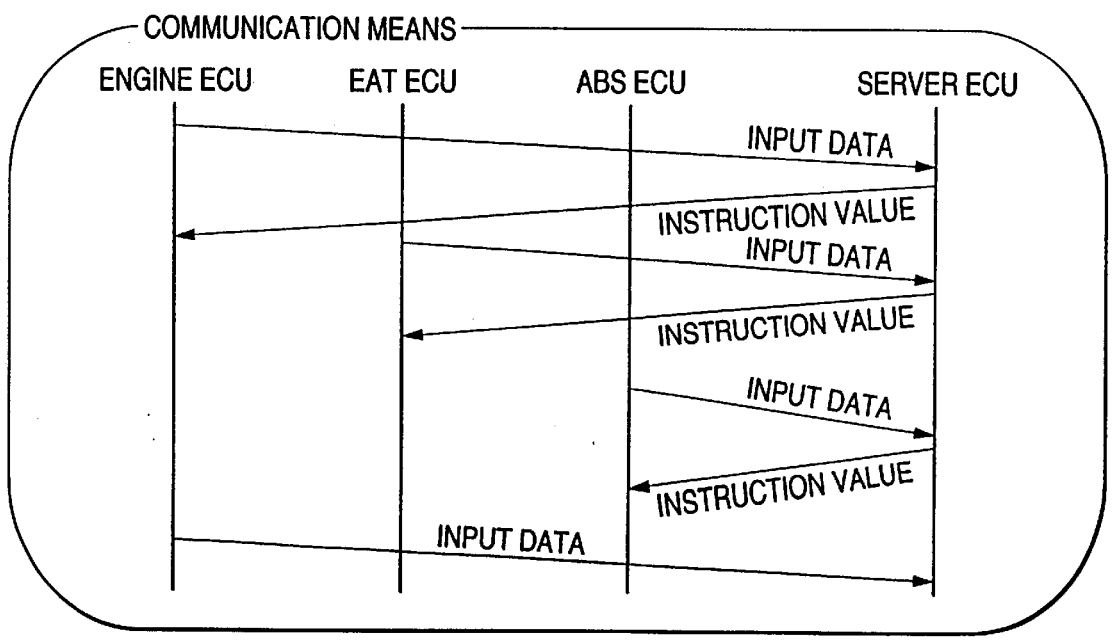
FIG. 2 is a conceptual representation of communications procedures used for a server/client system with a configuration of the on-vehicle LAN system.

FIG. 2 is a conceptual representation of communications procedures when the on-vehicle LAN is configured in the form of a server/client system. The engine ECU 2 sends to the server ECU 1 various parameter data sets output from the sensors 2S, such as an intake pipe pressure and an engine speed. From these parameter data sets and other relevant parameters that are received from other client ECUs and are stored in the storage device, the server ECU 1 computes and transmits the fuel injection time as an instruction value to the engine ECU 2.

Similarly, an automatic transmission ECU 3 sends to the server ECU 1 the data that are detected by and output from the sensor 3S. From these data sets and other drive parameters that are received from other ECUs and are stored in the storage device, the server ECU 1 performs operations and transmits to the EAT ECU 3 an instruction value e.g. for instructing the actuator 3A to change from one transmission speed to another. Similarly, the ABS ECU 4 sends to the server ECU 1 the data received from the sensors 4S, and the server ECU 1 returns an instruction value to the ABS ECU 4.

As can be seen from the foregoing procedures, compared to the other client ECUs, data is transmitted by the server ECU 1 a significantly larger number of times and in a significantly larger volume. Accordingly, if the server/client LAN is operated according to the conventional token passing style, the server and the clients are given the token in equal measure, which may in turn increase the lag in data transmission by the server.

Figures 3, 4:
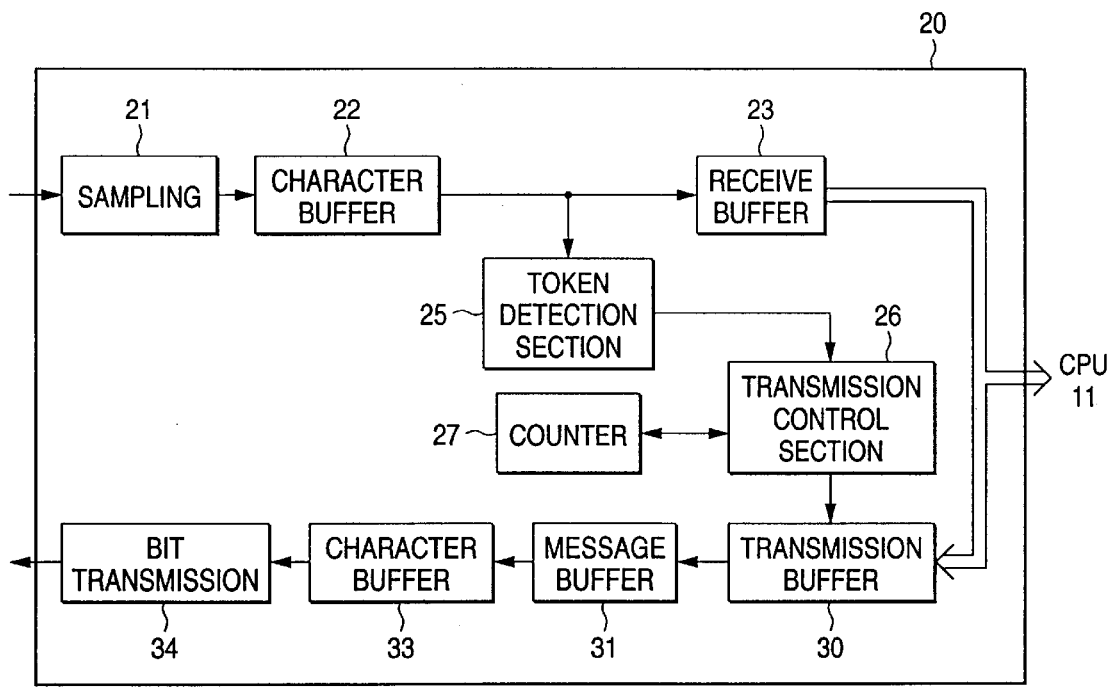
FIG. 3 a block diagram showing the communications controller for the server according to the preferred embodiment.

FIG. 3 is a block diagram showing the communications controller 20 of the server ECU 1 according to the present embodiment. The communications controller 20 comprises: a sampling circuit 21 which samples, on a per-bit-basis, a message received by way of the network bus 8; a character buffer 22 which reconstructs one byte (called a character for the sake of convenience) from the sampled bits; and a receive buffer 23 which receives and temporarily stores a data byte from the character buffer 22.

The communications controller 20 further comprises: a transmission buffer 30 which receives and temporarily stores messages to be sent from the CPU 11; a message buffer 31 which temporarily stores data to be sent on a per-message-basis; a character buffer 33 which receives data from the message buffer 31 on a per-byte-basis; and a bit transmission section 34 which receives data from the character buffer 33 on a per-bit-basis and sends the data to the network bus 8.

A token detection section 25 monitors a message sent to the server ECU 1 and detects the token addressed to the ECU 1. Specifically, the token detection section 25 reads a token from the formats of a data message and a token message, which will be described later, and determines whether or not the token is addressed to the server ECU 1. Communications controllers of all the ECUs monitor messages on the network bus 8. Each communication controller acquires a message addressed to its own address and ignores other messages.

Upon detection of the token addressed to the server ECU 1, the token detection section 25 sends a token detection signal to a transmission control section 26. In response to the detection signal, the transmission control section 26 reads transmission data from the transmission buffer 30 on a per-message-basis and stores the thus-read data into the message buffer 31. The network system is identical in basic configuration to a conventional network system and is capable of transmitting only one message upon acquisition of the token. At this time, data representing the next device to which the token (i.e., a token address) is to be passed are included in the message.

The communications controller 20 according to the present embodiment performs the following control operation so that the server ECU 1 can retain the token for a longer period of time while complying with the basic configuration of the network system. Specifically, in contrast with the communications controller of the client ECU, the communications controller 20 of the server ECU 1 is capable of temporarily storing a plurality of messages in the transmission buffer 30, as well as capable of sending a predetermined number of messages e.g. five messages. When the communications controller 20 acquires the token, a counter 27 is reset by the transmission control section 26. Subsequently, every time the communication controller 20 transmits a message, the counter 27 is incremented by one when receiving a counter increment signal from the transmission control section 26.

Until the counter 27 counts up to predetermined value (e.g., five), the transmission control section 26 sets the address of the server ECU 1 into the token address field of the message stored into the message buffer 31 from the transmission buffer 30. When the counter 27 counts to a predetermined value or the transmission buffer 30 becomes empty, the transmission control section 26 sets, into the token address field of the message to be sent, the address of the next ECU to which the token is to be passed. Once having acquired the token, the ECU 1 can thus transmit a predetermined number of messages which is not necessarily just limited to one.

In the foregoing description, the counter 27 counts the number of messages sent by the communications controller 20. However, alternatively, the counter 27 may count the clock pulse of the communications controller 20 or a pulse obtained through frequency-division of the clock pulse. A count value obtained by counting the clock pulse or the frequency-divided pulse corresponds to an elapsed time. When the time represented by a count value reaches a predetermined time e.g. 500 milliseconds, or when the transmission buffer 30 becomes empty, the transmission control section 26 sets, into the token address field of the message to be sent, the address of the next ECU to which the token is to be passed. Once having acquired the token, the server ECU 1 can continue transmitting messages for a predetermined time period or over a predetermined period which, again, is not necessarily limited to that of other ECUs.

In the present embodiment, only the server ECU 1 can transmit a plurality of messages during each possession of the token, and each client ECU can transmit only one message during each possession of the token. The client ECUs may be arranged in a hierarchy according to the volume of data traffic, and a client ECU having a high volume of data traffic may be arranged so as to be able to send a predetermined number of messages, for example, a few messages, during each possession of the token. The communications controller of each client ECU is formed so as to be identical in configuration to that of the server ECU, and the counter 27 is set with a predetermined number which triggers insertion, into the token address field of the message transmitted by the transmission control section 26, of the address of the next ECU to which the token is to be passed.

FIG. 4A shows the format of a data message exchanged among a plurality of ECUs by way of the network bus 8. The present embodiment is directed to an on-vehicle computer network, and the ECUs are connected to the network. In general, a computer system or communications controllers of a plurality of terminals is/are connected to a network, thereby constituting the computer network. Within the context of the communications network, these communications controllers connected to the network are called nodes. Consequently, the term "node" is often used for explanation of communication in the following description. In the embodiment, the term "node" corresponds to the communications controller of the ECU.

A start-of-message (SOM) field stores one bit of a dominant bit representing the start of a message. This SOM bit brings all the nodes connected to the network system into synchronization with one another.

A next-token-address (TA) field stores the address (four bits) of the node to which the token is addressed. In the description of the foregoing embodiment, this TA field has been referred to as the token address field.

A control (CTL) field stores two bits representing the type of the message, such that e.g. "10" represents that the message is a token message used for passing the token to the next node. In this case, the message assumes a format shown in FIG. 4B.

DATA_UNIT represents a field for storing data regarding contents to be transmitted and is capable of storing 32 bits (or 4 bytes) to 96 bits (or 12 bytes) of data.

A frame-check-sequence field corresponds to 15 bits of a field for storing a result of a cyclic redundancy check of a data sequence ranging from the SOM field to the DATA_UNIT field.

A data-acknowledge (DACK) field is used by a node which has correctly received data. This field comprises an acknowledge bit including first-half two bits and a delimiter of recessive bits including latter-half two bits. A transmission node sends the data frame by inserting four bits of recessive bits into the DACK field. When correctly receiving data, the node designated by the address node field included in the DATA_UNIT field writes the dominant bit over one of the first-half two bits of the DACK field, thereby acknowledging receipt of the data. Upon detection of the dominant bit in any one of the first-half two bits of the DACK field, the transmission node that is monitoring messages on the network determines the acknowledgement.

A token-acknowledge field is used for acknowledging that the node designated by the TA field has correctly received the token. As in the case with the DACK field, the TACK field comprises an acknowledge field including first-half two bits and a delimiter including later-half two bits. Further, the TACK field is used in the same manner as the DACK field.

An end-of-message (EOM) field represents the end of a message. The transmission node sends six bits of consecutive recessive bits as the EOM field.

In the foregoing description, the dominant bit represents a logic value of 1. The dominant bit can be written over the recessive bit. If the dominant bit and the recessive bit are simultaneously output to the bus, the bus recognizes the logic value of the dominant bit. The recessive bit represents a logic value of 0.

FIG. 5 is a flowchart showing a process flow according to the embodiment of the present invention. When the communications controller 20 of the server ECU 1 receives the token (step 101), the transmission control section 26 determines, from the status of the transmission buffer 30, whether or not there is a message to be sent (step 102). When there is a message to be sent, the counter 27 is incremented by one (step 103). A determination is made as to whether or not the counter 27 has counted up to a predetermined value (e.g., 5) (step 104). If the counter 27 has not yet counted up to the predetermined value, the address of the server ECU 1 is set in the token address field of the message in the manner as mentioned above (step 107), and the message is sent (step 108). In contrast, when the counter 27 has counted up to the predetermined value, the counter 27 is reset to 0 (step 105). The address of the next ECU to which the token is to be passed is set in the token address field of the message (step 106). In this case, the message may be a data message (such as that shown in FIG. 4A) or a token message (such as that shown in FIG. 4B).

If it has been determined in step 102 that there is no message to be sent, processing makes a jump to step 105, a token message is sent, and the counter 27 is reset. If the counter 27 has not yet counted up to the predetermined value in step 104, transmission of sequential data messages occurs until the counter 27 counts up to the predetermined value.

As has been mentioned, although the specific embodiment of the present invention has been described with reference to the example of an on-vehicle LAN, the present invention is not limited to such an example.

According to a first aspect of the present invention, in a network in which a plurality of data processors are interconnected, the volume of message data which can be transmitted during token holding time can be varied from one data processor to another. Accordingly, efficient communication can be established among a plurality of data processors which are unbalanced in terms of traffic volume.

According to a second aspect of the present invention, the number of messages sent by a data processor can be increased by setting its own address as the token address while the basic configuration of the network is one which sequentially passes the token among a plurality of data processors. Accordingly, efficient communication can be established among a plurality of data processors which are unbalanced in terms of volume of data to be transmitted.

According to a third aspect of the present invention, a server can possess the token from a time period substantially longer than those of clients, thereby enabling efficient support of a plurality of clients.

What is claimed is:

1. A network system which includes a plurality of data processors and sequentially passes a right to transmit, in the form of a token, among said data processors, wherein the token is passed to next data processor when a data processor holding the token has no data to be transmitted or after lapse of a predetermined time, and wherein at least one of said plurality of data processors is set as a high volume transmitting data processor for sending messages at one time in a greater number, by at least one, than the number of messages transmitted at one time by each of the other of said plurality of data processors which are not high volume transmitting data processors, during each token holding time, in such a manner that said high volume transmitting data processor again sets a token address field of a message to be transmitted to an address of said high volume transmitted data processor and thereafter transmits the message so that the token holding time of said high volume transmitting data processor is extended.

2. The network system as claimed in claim 1, wherein said plurality of data processors are configured with one another in a server-client relationship, wherein said high volume transmitting data processor is a server.

3. A network communication system for transmitting and receiving data messages among a plurality of data processing devices, wherein a token, representing a right to transmit, is passed among said plurality of data processing devices, said network communication system comprising:

at least one first data processing device capable of transmitting a first number of said data messages in a fixed transmitting period during which said first data processing device has said right to transmit;

at least one second and high volume transmission data processing device which is capable of transmitting a greater number of said data messages than said first number of said at least one first data processing device in a variable transmitting period greater than said fixed period during which said at least one high volume transmission data processing device possesses said right to transmit; and a network bus over which said data messages are transmitted, wherein said network bus is connected to said at least one first data processing device and said at least one high volume transmission data processing device.

4. A network communication system for transmitting and receiving data messages among a plurality of data processing devices, wherein a token, representing a right to transmit, is passed among said plurality of data processing devices, said network communication system comprising:

at least one first data processing device;

at least one second and high volume transmission data processing device which is capable of transmitting a greater number of said data messages than said at least one first data processing device in a transmitting period during which said at least one high volume transmission data processing device possesses said right to transmit; and a network bus over which said data messages are transmitted, wherein said network bus is connected to said at least one first data processing device and said at least one high volume transmission data processing device, wherein said at least one high volume transmission data processing device comprises:

a communication controller comprising:

a data reception system for sampling said data messages transmitted over said network bus;

a transmission section wherein outgoing data messages prepared by said at least one high volume transmission data processing device are stored and output to said network bus;

a token detection unit which monitors said data messages received in said data reception system, wherein said token detection unit detects said token within a token address field of a data message format, and wherein said token detection unit determines whether or not said token is addressed to said at least one high volume transmission data processing device, a transmission control section which, upon receiving a token detect signal from said token detection unit, causes said transmission section to output one of said outgoing data messages after setting a next token address in said token address field of said one of said outgoing data messages; and a counter which determines said transmitting period during which said at least one high volume transmission data processing device can transmit said greater number of said data messages.

5. A network communication system as claimed in claim 4, wherein said counter counts a quantity of said outgoing data messages transmitted by said at least one high volume transmission data processing device during said transmitting period, wherein said at least one high volume transmission data processing device has a high volume transmission data processing device address, wherein said at least first data processing device has a first data processing device address, wherein said next token address is said high volume transmission data processing device address during said transmitting period, and wherein said next token address is said first data processing device address after said transmitting period expires.

6. A network communication system as claimed in claim 5, wherein said transmitting period of said at least one high volume transmission data processing device expires either when said counter reaches a predetermined limit, or when said at least one high volume transmission data processing device has no said outgoing messages to transmit.

7. A network communication system as claimed in claim 4 wherein said counter counts clock pulses used to synchronize said at least one high volume transmission data processing device, wherein said at least one high volume transmission data processing device has a high volume transmission data processing device address, wherein said at least one first data processing device has a first data processing device address, wherein said next token address is said high volume transmission data processing device address during said transmitting period, and wherein said next token address is said first data processing device address after said transmitting period expires.

8. A network communication system as claimed in claim 7, wherein said transmitting period of said at least one high volume transmission data processing device expires either when said counter reaches a predetermined limit, or when said at least one high volume transmission data processing device has no said outgoing messages to transmit.

9. A method for controlling transmission of data messages among a plurality of data processing of a network system, wherein said plurality of data processing devices comprises at least one second and high volume transmission data processing device which is capable of transmitting a greater number of said data messages than first data processing devices in a transmitting period during which said at least one high volume transmission data processing device possesses a right to transmit, wherein said method comprises:

processing, in said at least one high volume transmission data processing device, outgoing messages to be transmitted over said network bus;

monitoring, in said at least one high volume transmission data processing device, said data messages transmitted over a network bus;

outputting one of said outgoing messages from said at least one high volume transmission data processing device after setting a next token address in a token address field of said one outgoing message, when said at least one high volume transmission data processing device detects an address corresponding to said at least one high volume transmission data processing device in said monitoring step; and controlling said transmitting period to allow said at least one high volume transmission data processing device to sequentially output said greater number of said data messages during said transmitting period, by setting said next token address to be an address of said at least one high volume transmission data processing device.

10. A method for controlling transmission of data messages as claimed in claim 9, wherein said controlling step comprises:

receiving a token indicating that said at least one high volume transmission data processing device is granted said right to transmit;

determining if there are any of said outgoing messages ready to transmit to said at least one high volume transmission data processing device, wherein a counter is incremented by one if it is determined that there is at least one of said outgoing messages ready to transmit;

setting said next token address to said same address of said at least one high volume transmission data processing device if:
1) said determining step determines that there is said at least one of said outgoing messages ready to transmit; and
2) said counter has not counted up to a predetermined counter value; and resetting said counter to zero and setting said next token address to a next node address of a next data processing device to which said token is to be passed if:
1) said determining step determines that there is no said at least one of said outgoing messages ready to transmit; or
2) said determining step determines that there is said at least one of said outgoing messages ready to transmit, and said counter has counted up to said predetermined counter value.

11. A network communication system for transmitting and receiving data messages among a plurality of data processing devices, wherein a token, representing a right to transmit, is passed among said plurality of data processing devices, said network communication system comprising:

at least one high volume transmission data processing device; and at least one regular data processing device;

wherein said at least one high volume transmission data processing device has the ability to address said token to itself.

12. A network communication system as claimed in claim 11, wherein said at least one high volume transmission data processing device further comprises:

a counter, which enables said at least one high volume transmission data processing device to retain said token by addressing said token to itself if said at least one high volume transmission data processing device has said data messages to transmit and if said counter has not reached an end of a count cycle.

13. A network communication system as claimed in claim 12, wherein said counter counts a quantity of said outgoing data messages transmitted by said at least one high volume transmission data processing device to increment said counter during said count cycle, wherein said at least one high volume transmission data processing device passes said token to said at least one high volume transmission data processing device during said count cycle, and wherein said at least one high volume transmission data processing device passes said token to another of said plurality of data processing devices after said counter reaches the end of said count cycle.

14. A network communication system as claimed in claim 12, wherein said counter counts clock pulses to increment said counter during said count cycle, wherein said at least one high volume transmission data processing device passes said token to said at least one high volume transmission data processing device during said count cycle, and wherein said at least one high volume transmission data processing device passes said token to another of said plurality of data processing devices after said counter reaches the end of said count cycle.

* * * * *